United States Patent [19]

Sheen

[11] Patent Number: 5,133,654
[45] Date of Patent: Jul. 28, 1992

[54] MECHANISMS FOR MANUFACTURING OF A FIRE-RESISTANT, WATER-PROOF AND HEAT-INSULATING BOARD

[76] Inventor: Chao-Chin Sheen, 283, Sec. 4, Fu-Hsin Rd., Taichung, Taiwan

[21] Appl. No.: 664,808

[22] Filed: Mar. 5, 1991

[51] Int. Cl.⁵ ............................................... B05C 5/02
[52] U.S. Cl. .................... 425/104; 118/323; 118/324; 425/140; 425/505; 425/514; 425/517
[58] Field of Search ............... 425/500, 505, 508, 514, 425/517, 520, 140, 115, 4 R, 817 R, 104; 118/323, 324; 198/836.1

[56] References Cited

U.S. PATENT DOCUMENTS

| | | | |
|---|---|---|---|
| 3,173,828 | 3/1965 | Oesterheld | 425/500 X |
| 3,174,887 | 3/1965 | Voelker | 425/505 X |
| 3,492,188 | 1/1970 | Wandel | 425/508 X |
| 3,526,556 | 9/1970 | Berner | 425/500 X |
| 3,594,254 | 7/1971 | Lemelson | 425/514 X |
| 3,644,606 | 2/1972 | Auge et al. | 425/505 X |
| 4,769,202 | 9/1988 | Eroskey et al. | 425/115 X |

*Primary Examiner*—Richard L. Chiesa
*Attorney, Agent, or Firm*—Larson & Taylor

[57] ABSTRACT

An apparatus is provided for the manufacture of a fire-resistant, waterproof and heat-insulating board. The apparatus includes upper and lower roller conveyors of an appropriate length upon which synchronously rotating retaining walls are arranged at the sides thereof, an automatic spray gun for spraying an insulating foam onto board material, a mangle for shaping the board material, board cutting apparatus located at the output end of the apparatus, and an adjustor for the apparatus. The operation of the apparatus can be suitably adjusted on the basis of the desired specifications of the board produced.

13 Claims, 6 Drawing Sheets

MECHANISMS FOR MANUFACTURING OF A FIRE-RESISTANT, WATER-PROOF AND HEAT-INSULATING BOARD

BACKGROUND OF THE INVENTION

Asbestos tiles are commonly used as roofing materials of a building constructed with iron bars. However, asbestos tiles are expensive, heavy and fragile, even though they are good heat-insulating and fire-proof materials. It is a common practice that insulating boards are placed under asbestos tiles to ensure that a better insulation is achieved. But such practice is costly. Therefore, some substitutes such as plastic wavy board, metal wavy board, red clay wavy board, etc. have been developed. But they lack adequate insulating property to serve the purpose well and have to be reinforced by means of other insulating materials, such as vinylon board or foaming materials. The application of additional insulating materials like vinylon board and foaming materials is a tedious and costly operation.

The present invention provides a remedy for the situation mentioned above by means of an automated manufacturing process of insulating board, in which waterproof insulating boards produced are automatically coated with foaming agent. As a result, insulating boards can be made in quantity rapidly and economically.

SUMMARY OF THE INVENTION:

According this invention a machine for use in manufacturing insulating board comprises mainly upper and lower roller conveyors of an appropriate length, upon which a synchronously rotating stopper or retaining wall is arranged, an automatic spray gun, a mangle, a board cutting apparatus, and an adjustor. The operation of the machine can be suitably adjusted on the basis of the desired specifications of the board being produced.

DETAILED DESCRIPTION OF THE PREFERRED EMBODIMENT

Figure 1:
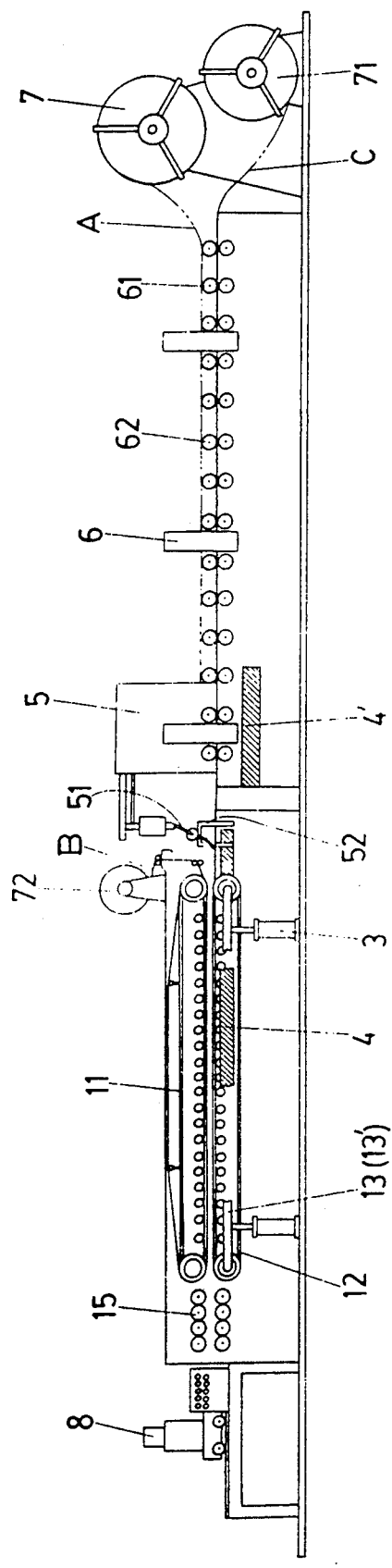
FIG. 1 shows a schematic side elevation view of the over-all layout of an embodiment according to the invention.
Figure 3:
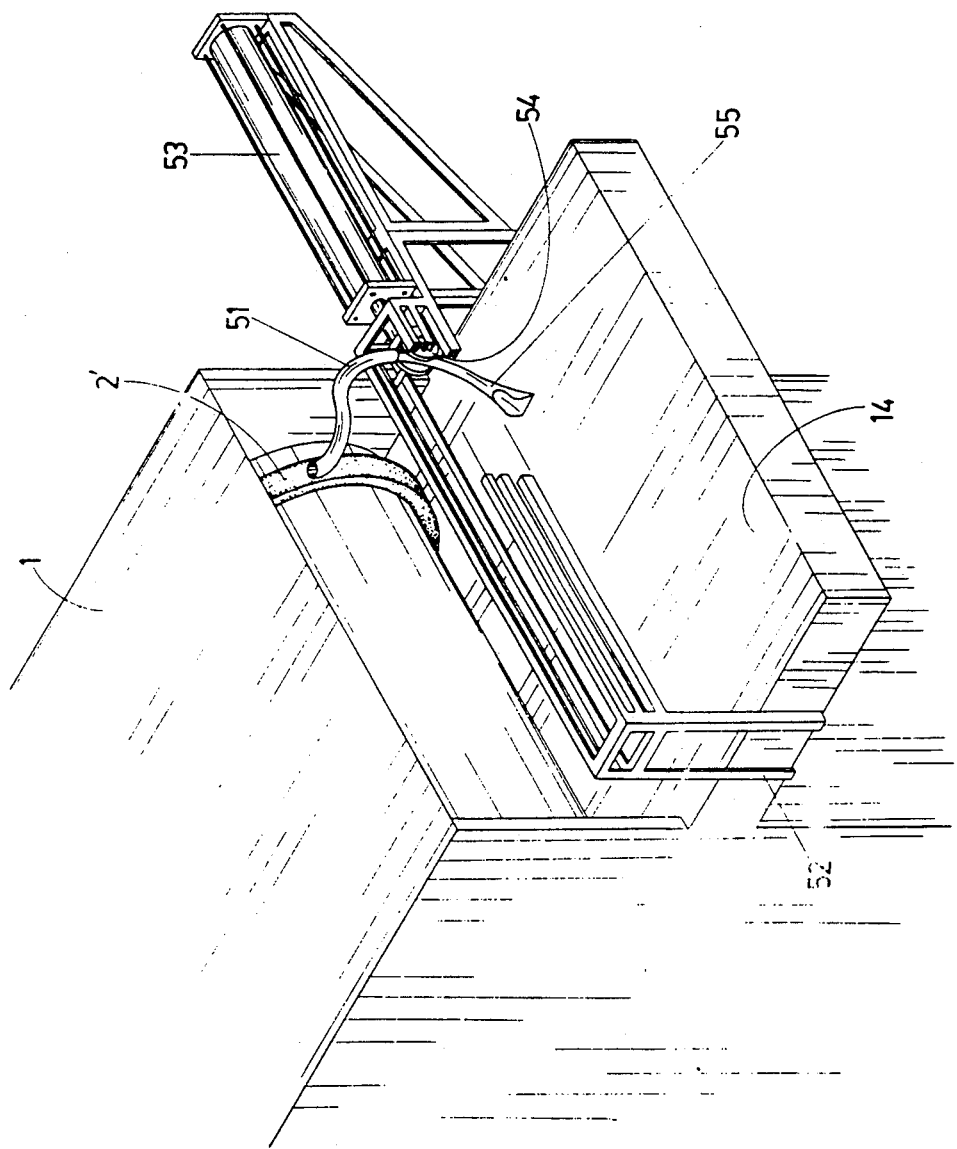
FIG. 3 shows a schematic perspective view of the sliding frame of a foamer embodied in the present invention.

Referring to FIG. 1, an embodiment of the present invention is shown comprising a body frame of an appropriate length. The body frame comprises upper and lower roller conveyors 11 and 12. A stopper or retaining wall in the form of a belt 2 is arranged at each end (side) of upper roller conveyor 11 while a plurality of stoppers or retaining walls in the form of belts 21, to 26 (as shown, e.g., in FIG. 5) are disposed at appropriate positions over the lower roller conveyor 12. The stoppers mentioned above should rotate synchronously with upper and lower conveyors 11 and 12. A set of adjustors 3, which act synchronously, are disposed on the support stands 13 and 13' arranged at both ends of the lower roller conveyor 12. A heater 4 is arranged at the front section of the inner side of the lower roller conveyor 12. A mangle 6 is arranged at the front end of the support body 1. Another heater 4' is disposed under the mangle 6 in the vicinity of the support body 1. A rotary plate or drum 7 is arranged at the outermost end of the mangle 6. A foamer 5 is installed at one side located between the mangle 6 and the support body 1. As is best seen in FIG. 3, a supply conduit 51 of the foamer 5 is connected with the pushing axle 54 of a air-operated pushing device 53 located on a sliding frame 52 in front of the support body 1. A spray head 55 connected to conduit 51 is arranged at the space located between upper and lower roller conveyors 11 and 12. A slidable cutting apparatus 8 is arranged at the rear or output end of the support body 1.

The manufacturing process of waterproof insulating board according to this invention is illustrated hereinafter.

Figure 2:
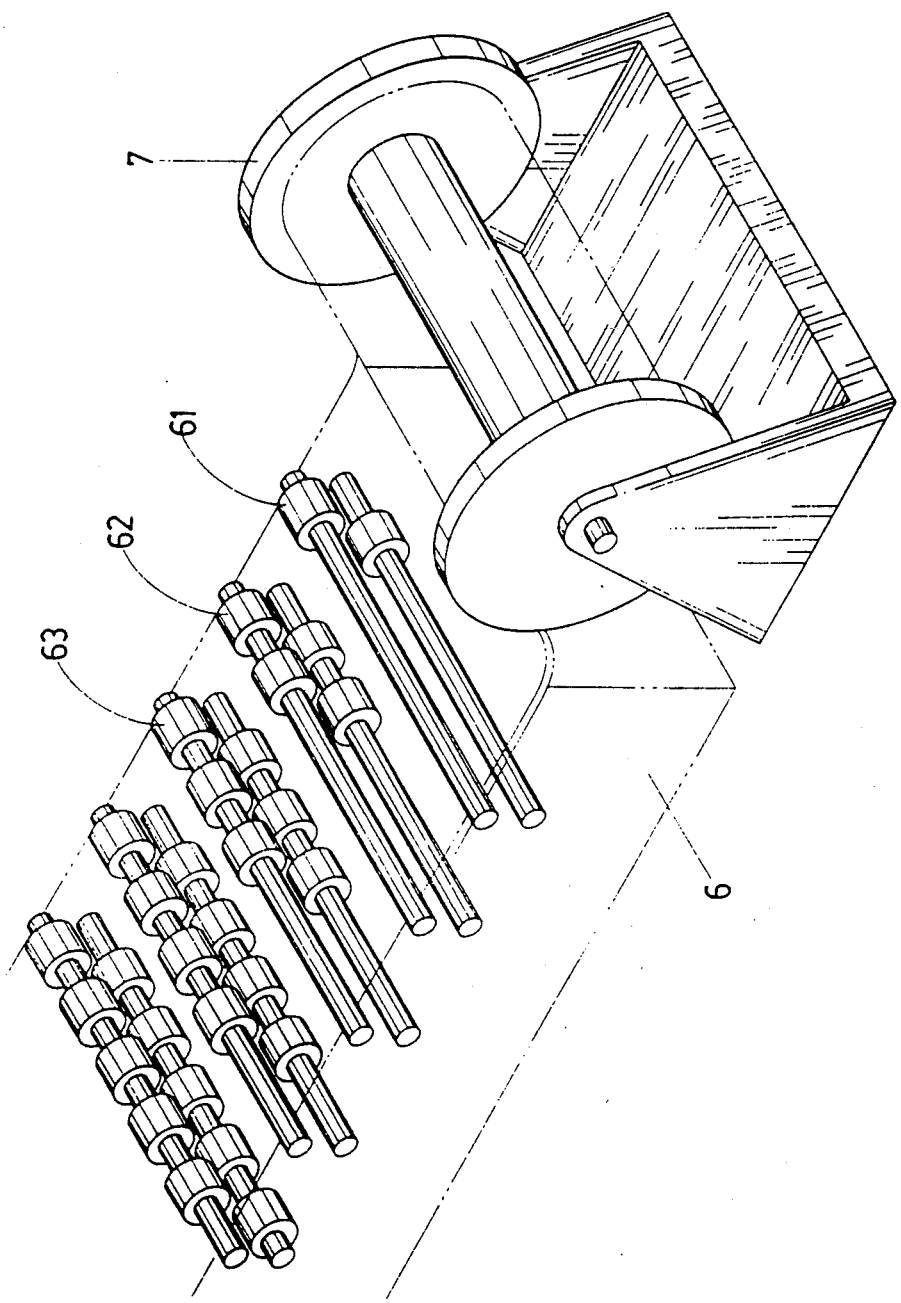
FIG. 2 shows a schematic perspective view of a mangle embodied in the invention.
Figure 4:
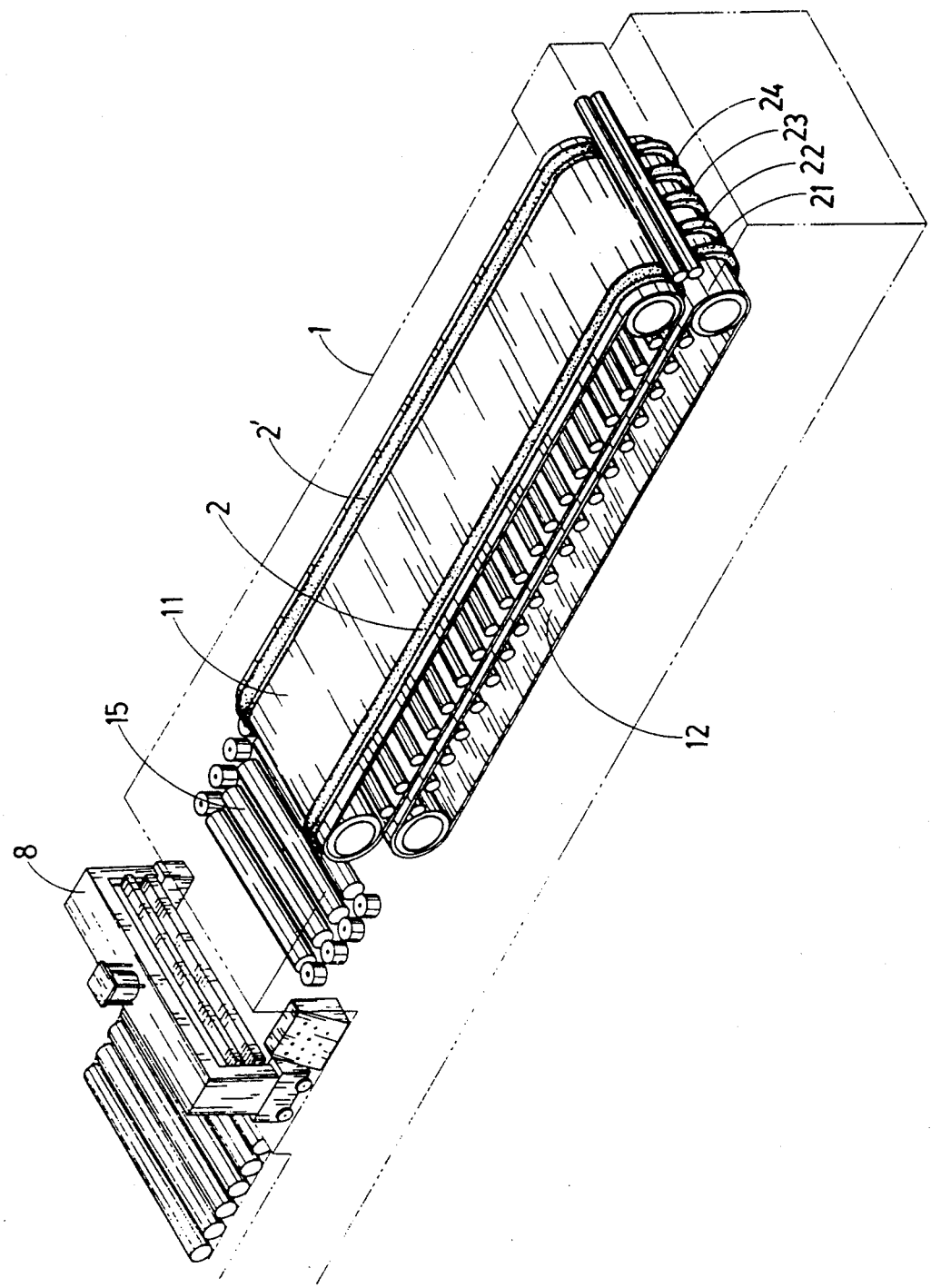
FIG. 4 shows a schematic perspective view of the body frame and of cutting apparatus embodied in the present invention.
Figure 5:
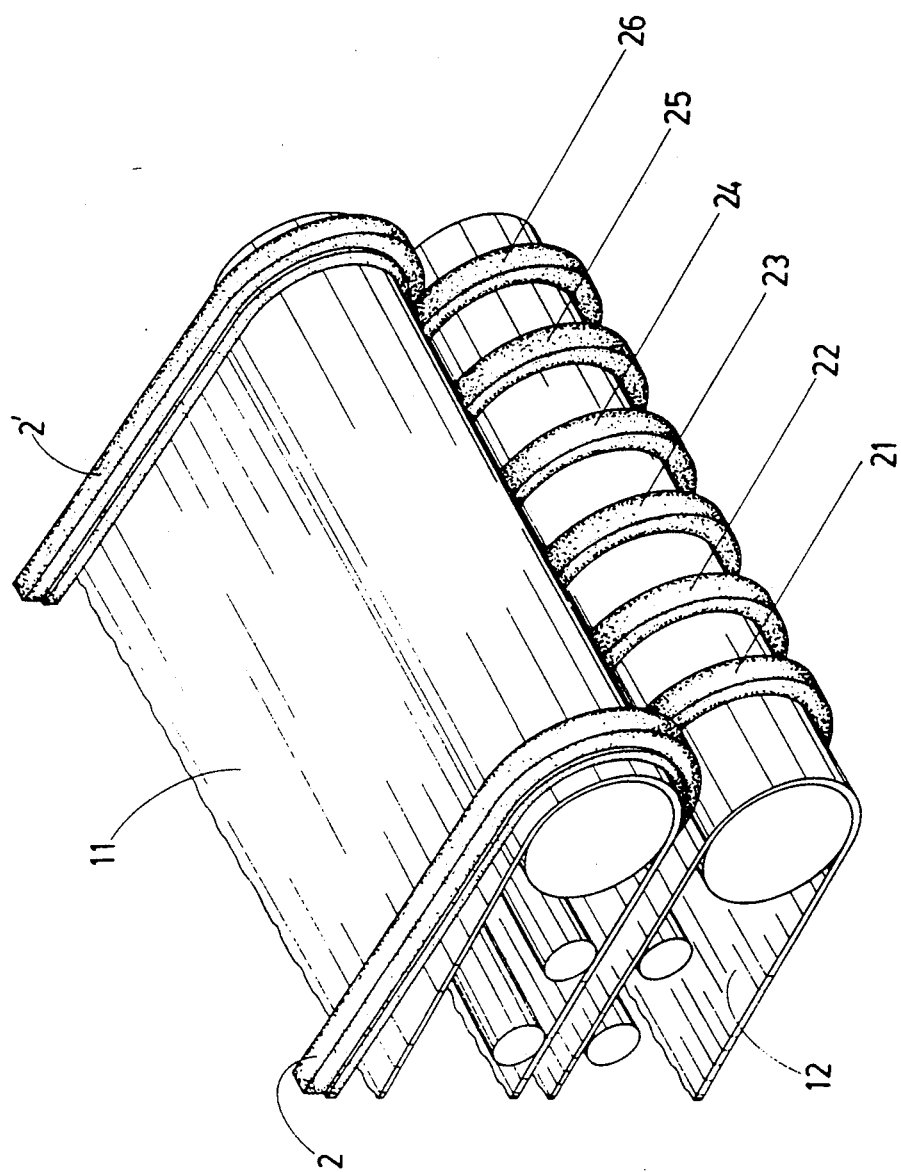
FIG. 5 shows a schematic perspective view of the stoppers and of the roller conveyors embodied in the present invention.
Figure 6:
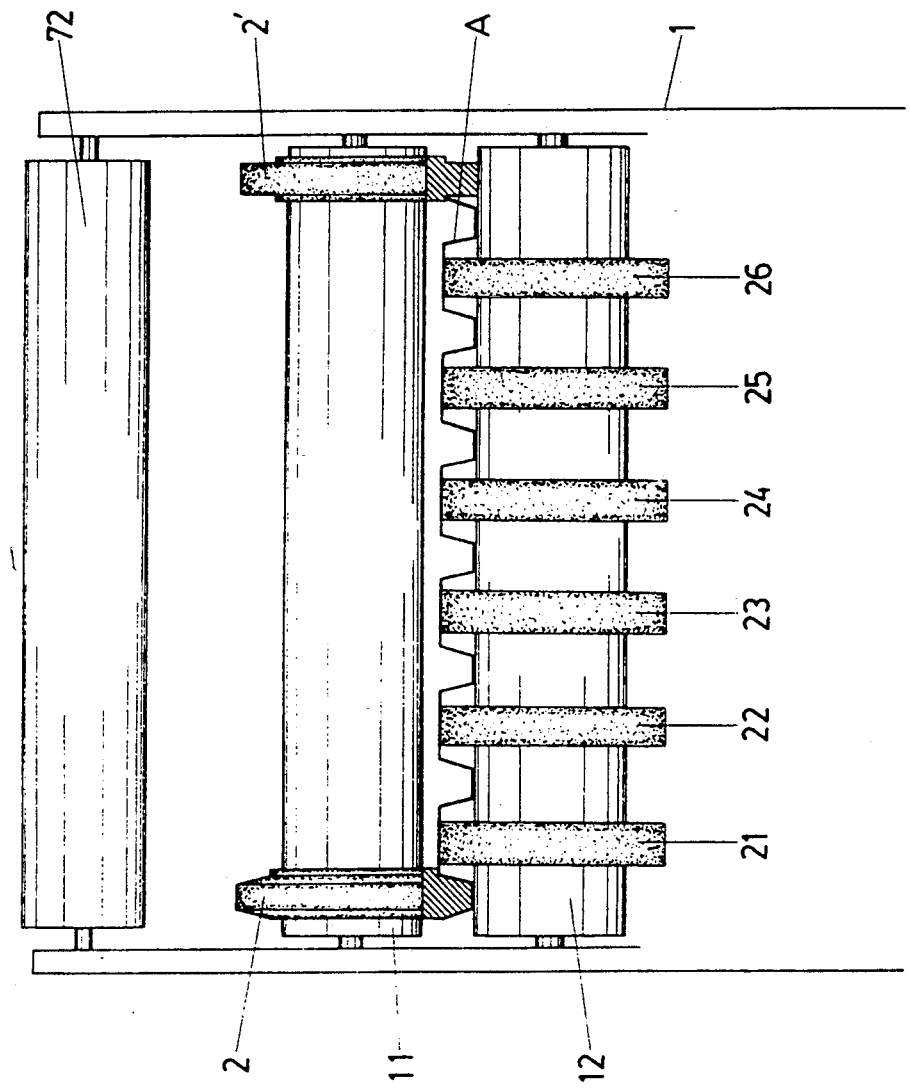
FIG. 6 shows a schematic and view of the stoppers and of the roller conveyors embodied in the present invention.

The board produced comprises upper and lower layers. A layer of foaming material is generally sandwiched between upper and lower layers. The upper layer is generally made of a baked metal board A while the lower layer is made of nylon cloth B or metal board C. If metal boards A and C are used as upper and lower layers, they must be placed separately on rotary plates or drums 7 and 71. In addition, the front end of metal board A or C must be inserted into the shape-forming roller wheels indicated at 61, 62 and 63 in FIG. 2 so as to be made as wavy boards, as shown in FIG. 2. They are subsequently transported automatically to the platform 14 located between upper and lower roller conveyors 11 and 12. In the meantime, the foamer 5 is activated to send foaming agent to spray tube 55 via conduit 51. The pushing device 53 located at the sliding frame 52 is responsible, in cooperation with upper and lower roller conveyors 11 and 12 , for spraying the foaming agent evenly on the metal board A and the nylon cloth B, as shown in FIG. 3. The sprayed metal board A and the sprayed nylon cloth B are transported to stoppers 2 and 2',wherein the final foaming and hardening processes are brought to completion, as shown in FIG. 4 and 5. The processed metal board A and the processed nylon cloth B are finally pressed to take form by means of a mangling roller wheel 15. The cutting apparatus 8 is employed to cut the finished boards into various sizes based on specifications. The heaters 4 and 4' are used to control the time of foaming in order to ensure that quality of products is consistently maintained.

On the basis of foregoing description of the embodiment, it is apparent that the machine embodied in the invention is capable of manufacturing automatically and continuously the insulating boards, the reasons being that the upper layer metal board A, the lower layer nylon cloth B or metal board C, and foaming agent are transported continuously and that stoppers 2 and 2' permit upper and lower layers to be coated evenly with foaming agent. In addition, the space between upper and lower roller conveyors 11 and 12 can be adjusted at will by means of an adjusting means located at the end of support stands 13 and 13', so as to control the thickness of boards produced. The conventional machine currently in use is not equipped with a mechanism as such.

What is claimed is:

1. Apparatus for manufacturing insulating board, said apparatus comprising:
    a body frame including an input end and an output end, and comprising at least one roller conveyor;
    a rotary drum for feeding board material to said roller conveyor;
    a mangle, disposed between said rotary drum and said body frame, for shaping the board material;
    a foamer device, disposed between said mangle and the input end of said body frame, for spraying an insulating foam onto said board material; and
    a cutting apparatus disposed at the output end of said body frame,
    said foamer device comprising a spray tube and means for moving the spray tube transversely to the board material so as to apply the insulating foam in a uniform manner to the board material.

2. An apparatus as claimed in claim 1, wherein said body frame comprises upper and lower roller conveyors having retaining walls arranged at the side thereof.

3. An apparatus as claimed in claim 2, further comprising adjustors disposed on support stands arranged at opposite ends of said lower roller conveyor, and a heater arranged at a front section of an inner side of said lower roller conveyor, said mangle comprising a mangling roller wheel.

4. An apparatus as claimed in claim 1, wherein said mangle can be fitted with different roller wheels for forming different shapes.

5. An apparatus as claimed in claim 1, wherein a rotary drum is disposed above a front end portion of said body frame.

6. Apparatus as claimed in claim 1 wherein said means comprises a pusher device comprising a movable pusher arm connected to said spray tube for providing movement thereof.

7. An apparatus as claimed in claim 1 wherein said spray tube comprises a conduit having a distal end and a spray head connected to said distal end of said conduit.

8. Apparatus for manufacturing insulating board, said apparatus comprising:
    a body frame including an input end and an output end, and comprising at least one roller conveyor;
    a rotary drum for feeding board material to said roller conveyor;
    a mangle, disposed between said rotary drum and said body frame, for shaping the board material;
    a foamer device, disposed between said mangle and the input end of said body frame, for spraying an insulating foam onto said board material; and
    a cutting apparatus disposed at the output end of said body frame,
    said at least one roller conveyor comprising retaining walls disposed at the sides of said conveyor for retaining in place board material having said insulating foam sprayed thereon.

9. Apparatus as claimed in claim 8 wherein said retaining walls comprise first and second laterally spaced belts which move synchronously with said conveyor.

10. Apparatus as claimed in claim 8 wherein said body frame comprises upper and lower roller conveyors and said upper and lower roller conveyors both comprise retaining walls disposed at the sides thereof.

11. Apparatus as claimed in claim 10 wherein said lower roller conveyor comprises further retaining walls located between the retaining walls disposed at the sides thereof.

12. Apparatus as claimed in claim 8, wherein said foamer device includes a conduit which has an output end and which is connected to a movable pushing arm of a pushing device, and a spray head disposed at said output end of the conduit.

13. An apparatus as claimed in claim 8, wherein said cutting apparatus is equipped with an automatic sensor having means to determine the length of insulating boards.

* * * * *